(12) United States Patent
Jaradi et al.

(10) Patent No.: US 12,071,092 B1
(45) Date of Patent: Aug. 27, 2024

(54) AIRBAG ON HEAD RESTRAINT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/451,359

(22) Filed: Aug. 17, 2023

(51) Int. Cl.
  *B60R 21/207* (2006.01)
  *B60R 21/217* (2011.01)
  *B60R 21/262* (2011.01)
  *B60R 21/00* (2006.01)
  *B60R 21/16* (2006.01)

(52) U.S. Cl.
  CPC .......... *B60R 21/207* (2013.01); *B60R 21/217* (2013.01); *B60R 21/262* (2013.01); *B60R 2021/0048* (2013.01); *B60R 2021/161* (2013.01); *B60R 2021/2074* (2013.01)

(58) Field of Classification Search
  CPC ... B60R 21/207; B60R 21/217; B60R 21/262; B60R 2021/0048; B60R 2021/161; B60R 2021/2074
  See application file for complete search history.

(56) References Cited

U.S. PATENT DOCUMENTS

| | | | |
|---|---|---|---|
| 6,158,812 A * | 12/2000 | Bonke | B60N 2/818 297/216.12 |
| 7,150,468 B2 | 12/2006 | Pan | |
| 8,985,622 B1 * | 3/2015 | Cannon | B60R 21/231 280/730.2 |
| 9,827,876 B2 | 11/2017 | Madaras | |
| 10,202,095 B2 * | 2/2019 | Ohno | B60R 21/215 |
| 10,556,563 B2 | 2/2020 | Song | |
| 10,632,952 B2 | 4/2020 | Markusic | |
| 10,843,607 B2 * | 11/2020 | Kondo | B60N 2/829 |
| 11,077,780 B2 | 8/2021 | Akaike et al. | |
| 11,267,427 B1 * | 3/2022 | Deng | B60R 21/207 |
| 11,358,554 B1 * | 6/2022 | Jaradi | B60R 21/231 |
| 2014/0327234 A1 * | 11/2014 | Heurlin | B60N 2/2884 280/730.1 |

FOREIGN PATENT DOCUMENTS

CN    111169348 A    5/2020

* cited by examiner

*Primary Examiner* — Toan C To
(74) *Attorney, Agent, or Firm* — Frank A. MacKenzie; Bejin Bieneman PLC (57) ABSTRACT

A vehicle includes a vehicle-seat assembly. The vehicle-seat assembly includes a vehicle seat having a seatback. The vehicle-seat assembly includes a head restraint having a frame supported by the seatback and a sliding member supported by the frame. The vehicle-seat assembly includes a track between the sliding member and the frame. The sliding member is slidable along the track from an undeployed position to a deployed position. The vehicle-seat assembly includes an airbag inflatable from an uninflated position to an inflated position. The airbag has a base fixed to the sliding member in the uninflated position and the inflated position. The base forces the sliding member from the undeployed position to the deployed position as the airbag moves from the uninflated position to the inflated position.

20 Claims, 7 Drawing Sheets

AIRBAG ON HEAD RESTRAINT

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains mounted to roof rails, seat-mounted airbag, etc.

DETAILED DESCRIPTION

A vehicle-seat assembly includes a vehicle seat having a seatback. A head restraint has a frame supported by the seatback and a sliding member supported by the frame. A track is between the sliding member and the frame. The sliding member is slidable along the track from an undeployed position to a deployed position. An airbag is inflatable from an uninflated position to an inflated position. The airbag has a base fixed to the sliding member in the uninflated position and the inflated position. The base forces the sliding member from the undeployed position to the deployed position as the airbag moves from the uninflated position to the inflated position.

The sliding member may be rigid relative to the airbag in the deployed position.

The airbag in the uninflated position may include two legs each elongated in an upright direction and a curved portion extending from one leg to the other leg. One of the legs may include the base. The other of the legs may include a second base anchored to the frame of the head restraint.

The vehicle-seat assembly may include an inflator supported by the seatback and a fill tube extending from the inflator to the airbag.

The sliding member may move translationally along the track from the undeployed position to the deployed position.

The head restraint may be slidably adjustable relative to the seatback.

One of the track or the sliding member may include a spring-loaded pin biased toward the other of the track and sliding member, and the other of the track and sliding member may include a hole configured to receive the spring-loaded pin when the sliding member is in the deployed position.

The head restraint may include a covering supported by the frame. The sliding member may be between the covering and the frame in the undeployed position.

The airbag may be designed to move the slider from the undeployed position to the deployed position as the airbag inflates from the uninflated position to the inflated position.

The vehicle-seat assembly may include a second sliding member supported by the frame and a second track between the second sliding member and the frame. The second sliding member may be slidable along the second track from an undeployed position to a deployed position. The airbag may have a second base fixed to the second sliding member in the uninflated position and the inflated position. The second base may move with the second sliding member from the undeployed position to the deployed position of the second sliding member. The sliding member and second sliding member may be elongated coaxially. The sliding member and the second sliding member may move in opposite directions from the undeployed positions to the deployed positions. The airbag in the uninflated position may include two legs each elongated in an upright direction and a curved portion extending from one leg to the other leg. One of the legs may include the base and the other of the legs includes the second base.

A vehicle head restraint may include a frame, a sliding member supported by the frame, and a track between the sliding member and the frame. The sliding member is slidable along the track from an undeployed position to a deployed position. An airbag is inflatable from an uninflated position to an inflated position. The airbag has a base fixed to the sliding member in the uninflated position and the inflated position. The base moves with the sliding member from the undeployed position to the deployed position.

The sliding member may be rigid relative to the airbag in the deployed position.

The airbag in the uninflated position may include two legs each elongated in an upright direction and a curved portion extending from one leg to the other leg. One of the legs may include the base.

One of the track and the sliding member may include a spring-loaded pin biased toward the other of the track and sliding member, and the other of the track and sliding member may include a hole configured to receive the spring-loaded pin when the sliding member is in the deployed position.

The airbag may be designed to move the slider from the undeployed position to the deployed position as the airbag inflates from the uninflated position to the inflated position.

The head restraint may include a second sliding member supported by the frame and a second track between the second sliding member and the frame. The second sliding member may be slidable along the second track from an undeployed position to a deployed position. The airbag may have a second base fixed to the second sliding member in the uninflated position and the inflated position, the second base moving with the second sliding member from the undeployed position to the deployed position of the second sliding member.

With reference to the Figures, wherein like numerals indicate like parts throughout the several views, a vehicle 10 includes a vehicle-seat assembly 12. The vehicle-seat assembly 12 includes a vehicle seat 14 having a seatback 16. The vehicle-seat assembly 12 includes a head restraint 18 having a frame 20 supported by the seatback 16 and a sliding member 22 supported by the frame 20. The vehicle-seat assembly 12 includes a track 24 between the sliding member 22 and the frame 20. The sliding member 22 is slidable along the track 24 from an undeployed position to a deployed position. The vehicle-seat assembly 12 includes an airbag 26 inflatable from an uninflated position to an inflated position. The airbag 26 has a base 28 fixed to the sliding member 22 in the uninflated position and the inflated position. The base 28 forces the sliding member 22 from the undeployed position to the deployed position as the airbag 26 moves from the uninflated position to the inflated position.

In response to certain vehicle impacts, the airbag 26 may be inflated from the uninflated position to the inflated position and the sliding member 22 may be deployed from the undeployed position to the deployed position. The sliding member 22 in the deployed position may operate as a reaction surface for the airbag 26 during certain vehicle impacts. The ability of the sliding member 22 to slide relative to the frame 20 from the undeployed position to the deployed position alleviates design restrictions on the cross-seat width of the head restraint 18. Specifically, the head restraint 18 may be relatively thin in a cross-seat direction when the slider is in the undeployed position and the movement of the slider from the undeployed position to the deployed position increases the cross-seat width of the head restraint 18 to operate as a reaction surface for the airbag 26 in the inflated position during certain vehicle impacts. Since the base 28 of the airbag 26 is fixed to the sliding member 22, the airbag 26 forces the sliding member 22 from the undeployed position to the deployed position as the airbag 26 inflates from the uninflated position to the inflated position. Specifically, the force of the airbag 26 inflating drives the slider from the undeployed position to the deployed position.

The head restraint 18 may include more than one sliding member 22. In the example shown in the Figures, the head restraint 18 includes four sliding members 22 that are each moved by the airbag 26 to the deployed position as the airbag 26 inflates to the inflated position. In examples including more than one sliding member 22, the sliding members 22 may move in opposite directions from the undeployed position to the deployed position to increase the footprint of the head restraint 18 in two opposite directions, as shown in the example in the Figures and as described further below.

Figure 1:
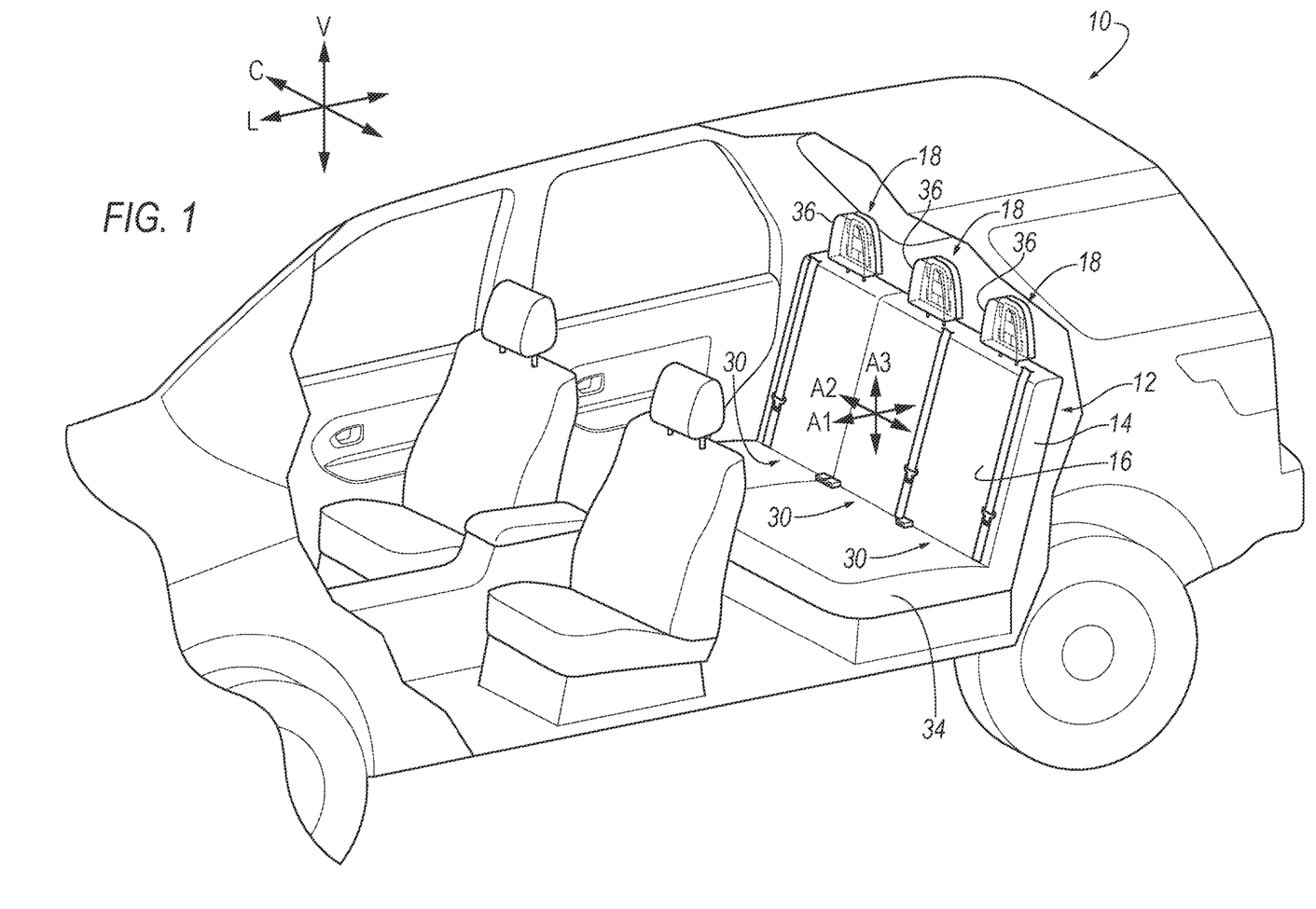
FIG. 1 is a cut-away view of a vehicle including a vehicle-seat assembly having three head restraints.
Figure 2:
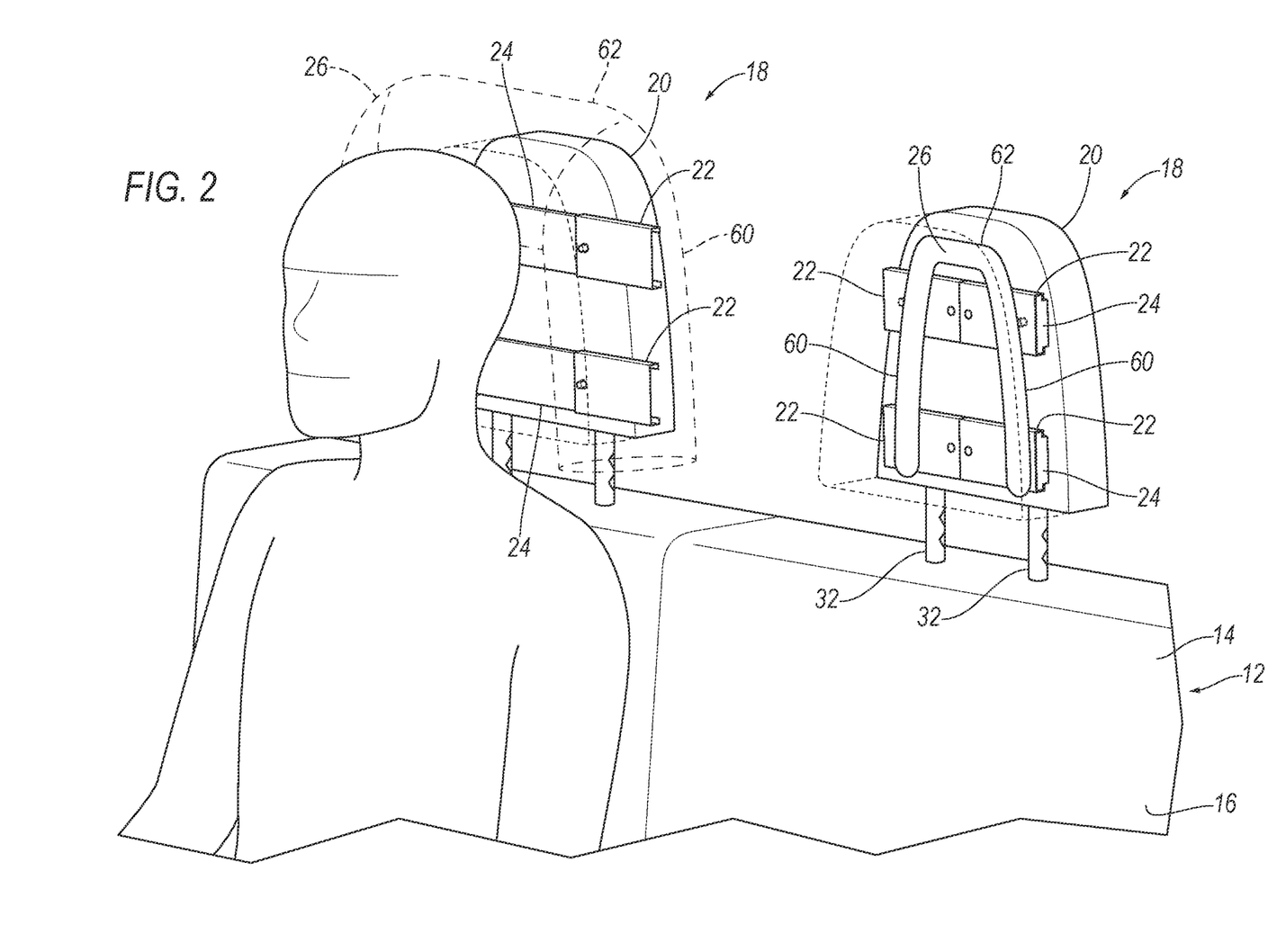
FIG. 2 is perspective view of a portion of the vehicle-seat assembly and two of the head restraints.
Figure 3:
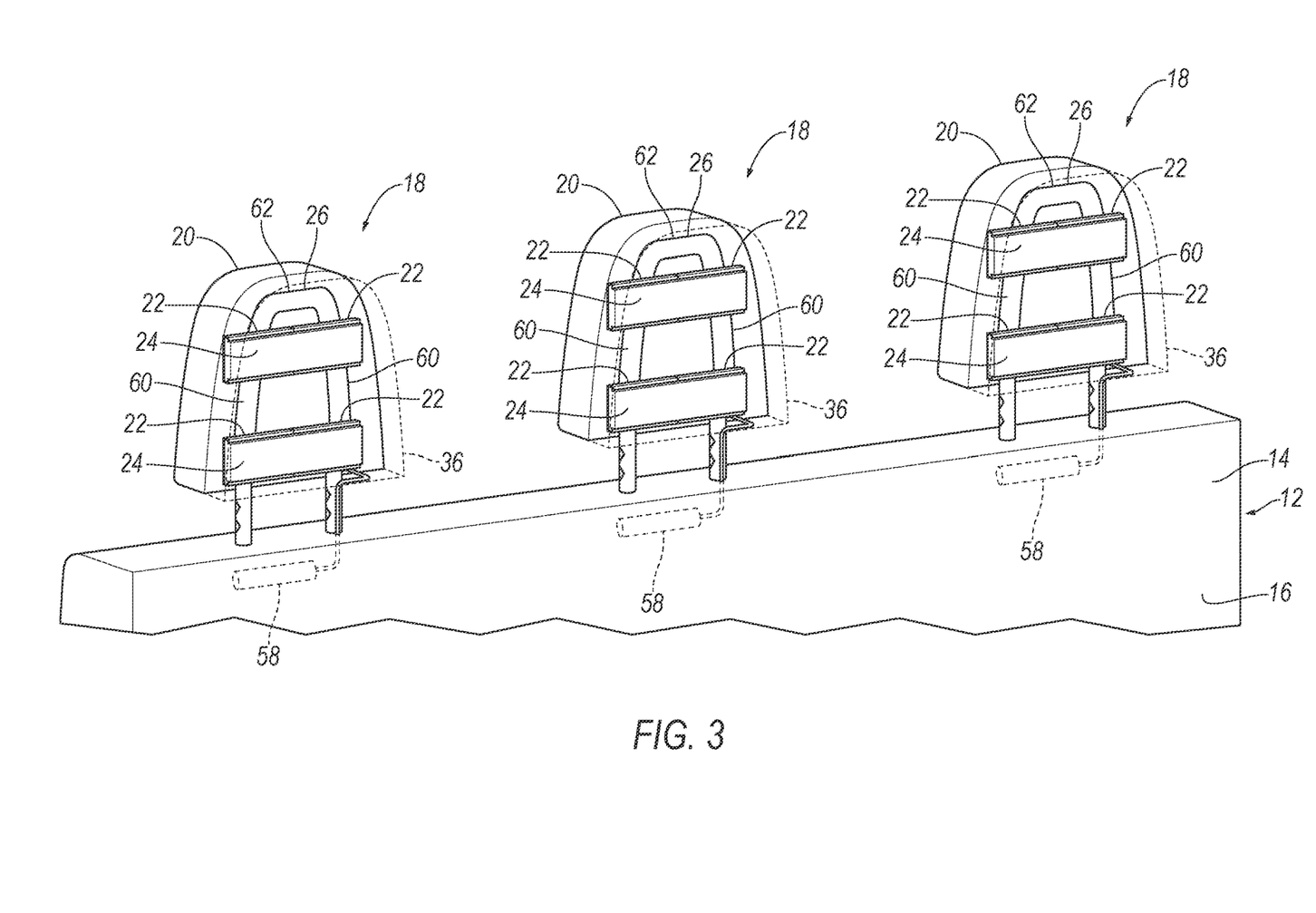
FIG. 3 is a rear perspective view of a portion of the vehicle-seat assembly with the sliding members of the head restraints in the undeployed position and the airbag in the uninflated position.
Figure 4:
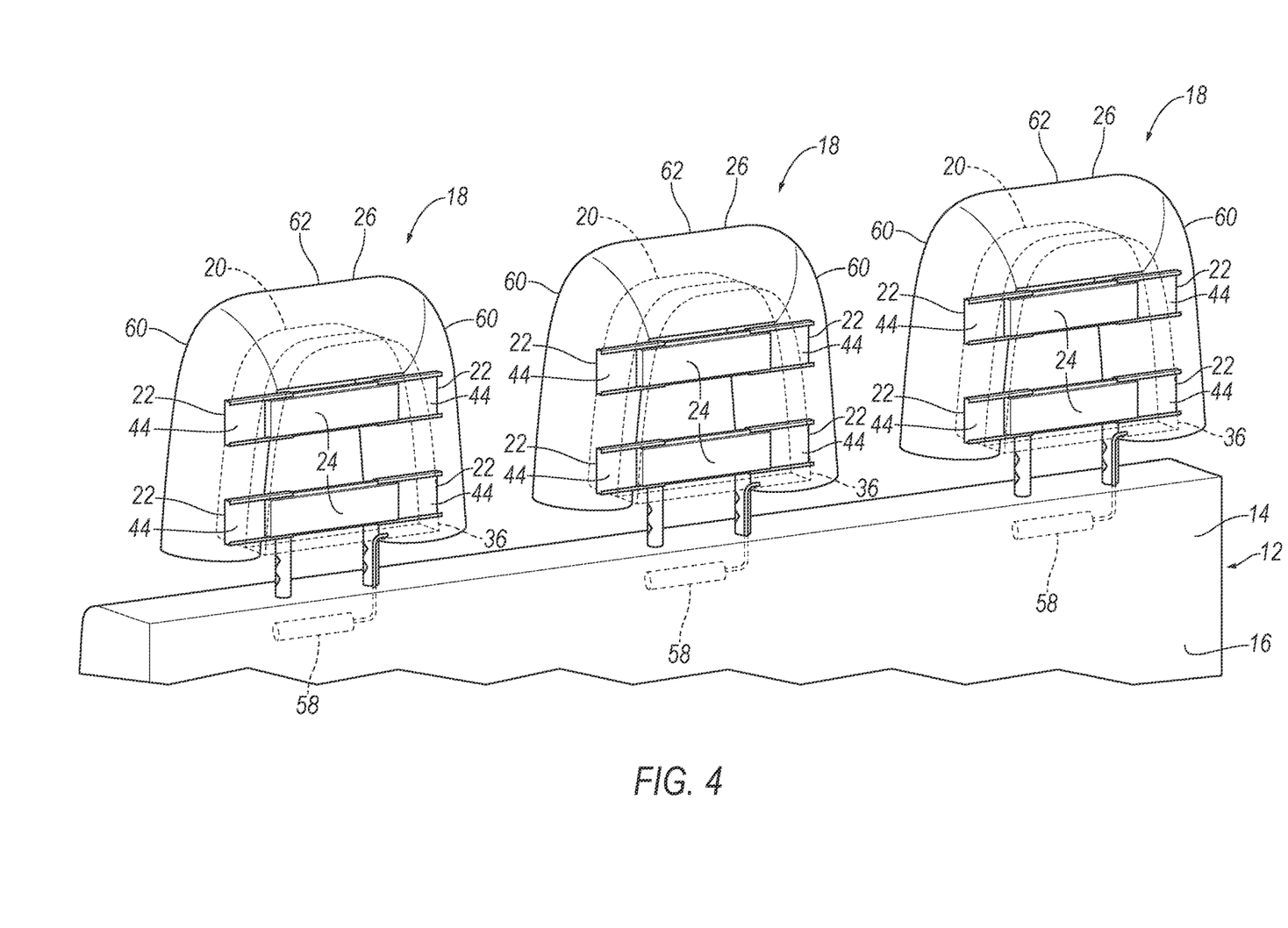
FIG. 4 is a rear perspective view of a portion of the vehicle-seat assembly with the sliding members of the head restraints in the deployed position and the airbag in the inflated position.
Figure 5:
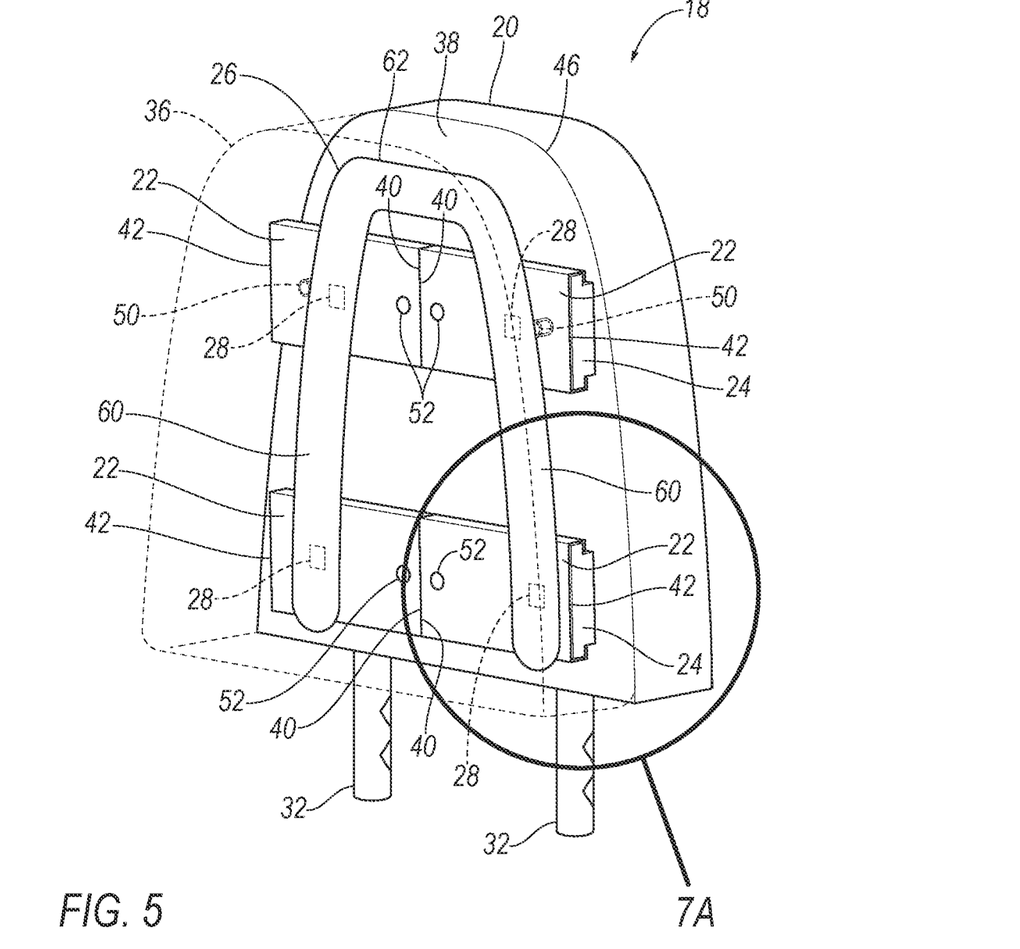
FIG. 5 is a front perspective view of the head restraint with the sliding members of the head restraints in the undeployed position and the airbag in the uninflated position.
Figure 6:
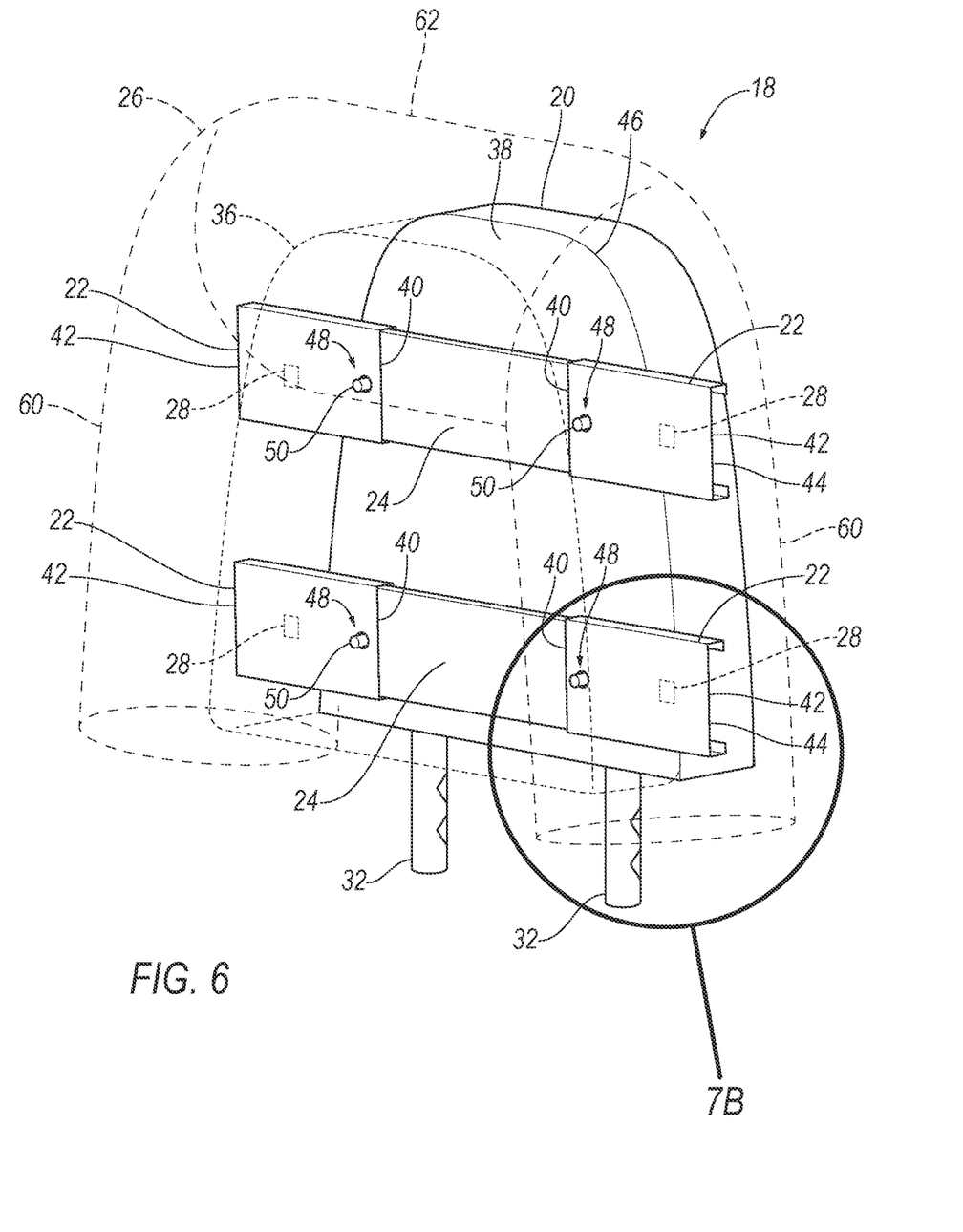
FIG. 6 is a front perspective view of the head restraint with the sliding members of the head restraints in the deployed position and the airbag in the inflated position.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. With reference to FIG. 1, the vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a vehicle floor and the vehicle 10 roof. The vehicle-longitudinal axis L, the cross-vehicle axis C, and the vertical axis V are perpendicular relative to each other.

The vehicle 10 includes a frame (not numbered) and a body (not numbered). The body may be of unitary construction, in which the frame is unitary with the body including frame rails, rockers, pillars, roof rails, etc. As another example, the body and frame may have a body-on-frame construction (also referred to as a cab-on-frame construction) in which the body (including rockers, pillars, roof rails, etc.) and frame are separate components, i.e., are modular, and the body is supported by and affixed to the frame. In other examples, the frame and body may have any suitable construction. The frame and the body may be of any suitable material, for example, steel, aluminum, and/or fiber-reinforced plastic, etc.

The frame 20 and/or the body defines a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle 10 includes one or more vehicle-seat assemblies 12. The vehicle-seat assembly 12 includes the vehicle seat 14, the head restraint 18, and the airbag 26. The head restraint 18 includes the sliding member 22 and the track 24. In examples including more than one vehicle-seat assembly 12, the vehicle-seat assemblies 12 may be identical or substantially identical to each other. In examples including more than one vehicle-seat assembly 12, one or more of the vehicle-seat assemblies 12 includes one or more head restraints 18 and corresponding airbags 26.

The vehicle-seat assemblies 12 are supported by the vehicle floor. The vehicle-seat assemblies 12 may be arranged in any suitable arrangement in the passenger compartment. As in the example shown in the Figures, one or more vehicle-seat assemblies 12 may be at the front end of the passenger compartment, e.g., in a front row (not numbered) such as a driver seat assembly and/or a passenger seat assembly and one or more of the vehicle-seat assemblies 12 may be behind the front row, e.g., as a rear row (not numbered). The vehicle-seat assemblies 12 may be of any suitable type, e.g., a bench seat, a bucket seat, etc. In the example shown in the Figures, the vehicle-seat assembly 12 in a rear row includes three occupant-seating areas 30 and three head restraints 18 and airbags 26, i.e., one head restraint 18 and airbag 26 for each occupant-seating area 30. In other examples, one or more of the vehicle-seat assemblies of a front row, e.g., a driver seat or a passenger seat, may include the airbag 26 assembly.

The vehicle seat 14 includes the seatback 16 and a seat bottom 34. The seatback 16 may be supported by the seat bottom 34 and may be stationary or movable relative to the seat bottom 34. The seatback 16 and the seat bottom 34 may be adjustable in multiple degrees of freedom.

The vehicle seat 14 defines a seat-forward direction along a seat-forward axis A1. The seat-forward direction extends forward relative to the vehicle seat 14. For example, the seat-forward direction may extend from a rear of the vehicle seat 14 to a front of the vehicle seat 14 relative to an occupant of the vehicle seat 14, i.e., the occupant of the vehicle seat 14 faces in the seat-forward direction when properly seated in the seat. The seat bottom 34 extends from the seatback 16 in the seat-forward direction. The vehicle seat 14 defines a cross-seat axis A2 and a seat-upright axis A3. The seat-forward axis A1, the cross-seat axis A2, and the seat-upright axis A3 are perpendicular to each other. The seat-forward axis A1 is parallel with the vehicle-longitudinal axis when the seat is forward facing, the cross-seat axis A2 is parallel with the cross-vehicle axis when the seat is forward facing, and the seat-upright axis A3 extends through the vehicle floor and the vehicle 10 roof when the seatback 16 is in an upright position. In the example shown in the Figures, the seat of the rear row includes three occupant-seating areas 30 positioned along the cross-seat axis A2. The occupant-seating area 30 is the space occupied by an occupant properly seated on the seat. The occupant-seating area 30 is seat-forward of the seatback 16 and above the seat bottom 34.

The vehicle seat 14, e.g., the seatback 16, includes a seat frame and a covering (not numbered) supported by the seat frame. The seat frame may include tubes, beams, etc. Specifically, the seat frame includes a seatback frame. The seat frame may be of any suitable metal (e.g., steel, aluminum, etc.) and/or any suitable plastic (e.g., carbon fiber reinforced plastic (CFRP), glass fiber-reinforced semi-finished thermoplastic composite (organosheet), etc.). The covering may include upholstery and padding. The upholstery may be cloth, leather, faux leather, or any other suitable material. The upholstery may have a class-A surface, i.e., a finished surface exposed to view by a customer and free of unaesthetic blemishes and defects.

The head restraint 18 is supported by the vehicle seat 14. The head restraint 18 may be supported by the seatback 16, i.e., the weight of the head restraint 18 is borne by the seatback 16. As shown in the Figures, the head restraint 18 is directly supported by the seatback 16, i.e., no intermediate components between the head restraint 18 and the seatback 16. The vehicle 10 may include any suitable number of head restraint 18s. In the example shown in the Figures, the vehicle seat 14 of the rear row includes three head restraints 18, specifically, one head restraint 18 for each occupant-seating area 30.

The head restraint 18 may be slidably adjustable relative to the seatback 16, as shown in the example in the Figures. In other words, the head restraint 18 may be selectively moved to discrete fixed positions by an occupant of the vehicle 10 prior to use. The head restraint 18, as an example, may be slidably adjustable, e.g., linearly adjustable upwardly and downwardly, to a position selected by the occupant prior to use. As an example, the head restraint 18 may include a pair of posts 32 slidably coupling the head restraint 18 to the seatback frame. The posts 32 may be fixed to one of the frame 20 of the head restraint 18 and the seatback frame and slidable relative to the other of the frame 20 and the head restraint 18. In the example shown in the Figures, the posts 32 are fixed to the frame 20 of the head restraint 18, i.e., to move as a unit with the frame 20 relative to the seatback frame, and are slidably engaged with the seatback frame. The posts 32 are elongated, and specifically, are elongated along the upright axis of the vehicle seat 14. The slidable coupling of the posts 32 and the seatback frame limits selective movement of the head restraint 18 to generally upward movement and generally downward movement of the head restraint 18 relative to the seatback 16. The posts 32 may be spaced from each other along the cross-seat axis A2. The posts 32 may be any suitable metal, plastic, fiber reinforced composite. The head restraint 18 may be locked relative to the seatback 16 (e.g., with a releasable lock, which may be, for example, currently known locks on head restraints 18) and unlocked relative to the seatback 16 for slidable adjustment. In other examples, the head restraint 18 may be permanently fixed in position relative to the seatback 16.

As set forth above, the head restraint 18 is supported by the seatback 16. Specifically, the frame 20 of the head restraint 18 may be supported by the seatback 16. In other words, the weight of the frame 20 of the head restraint 18 is borne by the seatback 16. Specifically, the weight of the frame 20 of the head restraint 18 is borne by the seatback frame through the posts.

The frame 20 of the head restraint 18 may be rigid relative to the airbag 26 in the inflated position. In other words, the airbag 26 deforms relative to the frame 20 of the head restraint 18 in the event the airbag 26 is forced against the frame 20 when the airbag 26 is in the inflated position. As set forth above, the frame 20 of the head restraint 18 operates as a reaction surface for the airbag 26 in the inflated position such that the frame 20 prevents seat-rearward movement of the airbag 26 in the event the airbag 26 is forced against the frame 20. The frame 20 may be, for example, any suitable metal, plastic, composite (e.g., carbon fiber reinforced plastic (CFRP), glass fiber-reinforced semi-finished thermoplastic composite (organosheet), etc.), etc.

As set forth above, the head restraint 18 may include a covering 36 supported by the frame 20. In the example shown in the Figures, covering 36 conceals the frame 20 and the airbag 26 from the passenger compartment when the airbag 26 is in the uninflated position and the sliding members 22 are in the undeployed position. The covering 36 may include upholstery and padding. The upholstery may be cloth, leather, faux leather, or any other suitable material. The upholstery may have a class-A surface, i.e., a finished surface exposed to view by a customer and free of unaesthetic blemishes and defects. The covering 36 may include a tear seam that allows the sliding members 22 and/or the airbag 26 to deploy through the covering when the airbag 26 is inflated to the inflated position.

As set forth above, the head restraint 18 includes the track 24 and the sliding member 22. The sliding member 22 is vehicle-forward of the head restraint 18. Specifically, the frame 20 of the head restraint 18 includes a seat-forward face 38 and the sliding member 22 is vehicle-forward of the seat-forward face 38. The track 24 may be on the seat-forward face 38 of the frame 20.

In some examples, including the example shown in the Figures, the head restraint 18 may include more than one sliding member 22. In the example shown in the Figures, the head restraint 18 includes four sliding members 22. In examples including more than one sliding member 22, the sliding members 22 may move in opposite directions from the undeployed position to the deployed position to increase the footprint of the head restraint 18 in two opposite directions, as described further below.

The track 24 is supported by the frame 20, i.e., the weight of the track 24 is borne by the frame 20. The track 24 is fixed to the frame 20, i.e., moves as a unit with the frame 20. As an example, the track 24 may be fixed to the frame 20 with fasteners, welding, adhesive, etc. In some examples, the track 24 may be unitary with the frame 20, i.e., the track 24 and the frame 20 are a single, uniform piece of material with no seams, joints, fasteners, or adhesives holding the track 24 and the frame 20 together. In such examples, the track 24 and the frame 20 are formed together simultaneously as a single continuous unit, e.g., by machining from a unitary blank, molding, forging, casting, etc. In one such example, the track 24 may be a recess of the frame 20 in which the sliding member 22 is movably engaged (not shown in the example in the Figures). In other examples, the track 24 and the frame 20 are non-unitary components that are formed separately and subsequently assembled, e.g., by threaded engagement, welding, adhesive, etc.

The sliding member 22 is supported by the frame 20, i.e., the weight of the sliding member 22 is borne by the frame 20. Specifically, the sliding member 22 is supported by the frame 20 when the sliding member 22 is in the undeployed position and in the deployed position. In the example shown in the Figures, the sliding member 22 is supported by the frame 20 through the track 24.

The sliding member 22 may terminate at a first end 40 and a second spaced from each other along the cross-seat axis A2. The sliding member 22 may be elongated from the first end 40 to the second end 42, i.e., the longest dimension of the sliding member 22 is along the cross-seat axis A2.

The sliding member 22 is slidably engaged with the frame 20. Specifically, the sliding member 22 is slidably engaged with the frame 20 through the track 24. In other words, the track 24 is fixed to the frame 20 and the sliding member 22 is slidably engaged with the track 24. The sliding member 22 may be slidably engaged with the track 24 at the first end 40 and the second end 42 in the undeployed position, as shown in the example shown in the Figures.

The sliding member 22 is slidable along the track 24 from the undeployed position to the deployed position. As an example, one of the sliding member 22 or the track 24 may have a channel 44 and the other of the sliding member 22 or the track 24 may be in the channel 44 and slidable relative in the channel 44. In the example shown in the Figures, the sliding member 22 includes the channel 44 and the track 24 is in the channel 44. The channel 44 and the sliding member 22 may be designed to retain the sliding member 22 to the track 24 as the sliding member 22 slides along the track 24 from the undeployed position to the deployed position. In the example shown in the Figures, the track 24 is T-shaped and the channel 44 of the sliding member 22 is rectangular with a slot open to the channel 44 to receive the T-shape of the track 24. In other examples, the sliding member 22 and the track 24 may be of any suitable shape such that the sliding member 22 slides along the track 24 from the undeployed position to the deployed position. The sliding member 22 and/or the track 24 may include friction-reducing features between the sliding member 22 and the track 24, e.g., bearings, coatings, etc.

In the example shown in the Figures, the sliding member 22 moves translationally along the track 24 from the undeployed position to the deployed position, i.e., all parts of the sliding member 22 move with the same velocity in parallel paths from the undeployed position to the deployed position. In the example shown in the Figures, the sliding member 22 is slidable along the cross-seat axis A2 from the undeployed position to the deployed position. In examples in which the sliding member 22 translates from the undeployed position to the deployed position, the first end 40 and the second end 42 may move along a common line, e.g., a line parallel to the cross-seat axis A2.

The sliding member 22 may be retracted relative to the frame 20 in the undeployed position and may be extended relative to the frame 20 in the deployed position. The first end 40 of the sliding member 22 is engaged with the track 24, e.g., in the channel 44, in both the undeployed position and the deployed position. The second end 42 of the sliding member 22 may be engaged with the track 24, e.g., in the channel 44, in the undeployed position. In the deployed position, the second end 42 of the sliding member 22 is spaced from the track 24. In other words, the sliding member 22 extends from the track 24 such that the second end 42 of the sliding member 22 is spaced from the track 24 in the deployed position. The frame 20 of the head restraint 18 has an outer periphery 46 bounding the vehicle-forward face of the frame 20. The first end 40 and the second end 42 of the sliding member 22 may be vehicle-forward of vehicle-forward face within the outer periphery 46 in the undeployed position. In other words, the second end 42 of the sliding member 22 is aligned with the vehicle-forward face along the cross-vehicle axis. The second end 42 of the sliding member 22 is spaced cross-vehicle from the outer periphery 46 of the frame 20 in the deployed position. In other words, the second end 42 of the sliding member 22 is outboard of the outer periphery 46 in the deployed position. Accordingly, the sliding member 22 in the deployed position increases the cross-vehicle size of the head restraint 18 to operate as a reaction surface for the airbag 26 in the inflated position.

The sliding member 22 may be rigid relative to the airbag 26 in the deployed position. In others, the airbag 26 deforms relative to the sliding member 22 when the sliding member 22 is in the deployed position and the airbag 26 is in the inflated position. The sliding member 22, the track 24, the frame 20, and the engagement of the sliding member 22 with the track 24 are designed so that the sliding member 22 is rigid relative to the airbag 26. The relative rigidity of the sliding member 22 relative to the airbag 26 allows the sliding member 22 to act as a reaction surface for the airbag 26 in the inflated position. The sliding member 22 may be any suitable material that is rigid to resist certain deformation if impacted by the airbag 26, e.g., metal, plastic, etc.

The sliding member 22 may be between the covering 36 and the frame 20 in the undeployed position. The covering 36 conceals the sliding member 22 when the sliding member 22 is in the undeployed position. The covering 36 may include a tear seam to allow the sliding member 22 to break through the covering as the sliding member 22 moves from the undeployed position to the deployed position.

The track 24 is between the sliding member 22 and the frame 20. As set forth above, the track 24 may connect the sliding member 22 to the frame 20. In some examples, including the example shown in the Figures, the head restraint 18 may include more than one track 24. In the example shown in the Figures, the head restraint 18 includes one track 24 for each sliding member 22, i.e., four track 24*s* and four sliding members 22. Specifically, in the example shown in the Figures, the head restraint 18 includes two pairs of tracks 24 with the tracks 24 of each pair being unitary with each other, i.e., formed together simultaneously as a single continuous unit, e.g., by machining from a unitary blank, molding, forging, casting, etc. In such an example, the tracks 24 of each pair are coaxially aligned along the cross-seat axis A2. In such an example, the two pairs of tracks 24 are spaced from each other along the seat-upright axis A3 of the vehicle seat 14.

Pairs of the sliding member 22 may be coaxial. In such examples, the sliding members 22 move in opposite directions from the undeployed positions to the deployed positions. In such an example, the sliding members 22 in the deployed position increase the cross-vehicle size of the head restraint 18 in two, opposite directions. The sliding member 22 and the second sliding member 22 may be elongated coaxially along the cross-seat axis A2 in both the undeployed position and the deployed position, as shown in the example in the Figures.

The track 24 guides movement of the sliding member 22 relative to the frame 20 between the deployed position and the undeployed position. The track 24 may be elongated along the cross-seat axis A2. The track 24 is supported by the frame 20 of the head restraint 18, i.e., the weight of the track 24 is borne by the frame 20 of the head restraint 18. The track 24 may be unitary with the frame 20 of the head restraint 18. In other examples, the track 24 may be formed separately from the head restraint 18 and subsequently fixed to the head restraint 18, e.g., with threaded fasteners, adhesive, welding, etc.

Figure 7A:
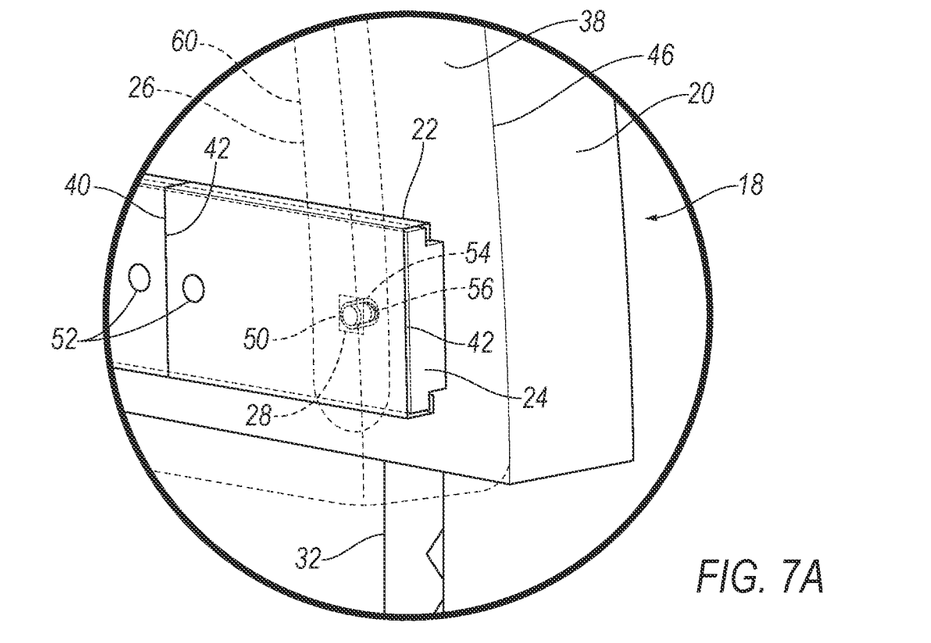
FIG. 7A is a magnified view of a portion of FIG. 5.
Figure 7B:
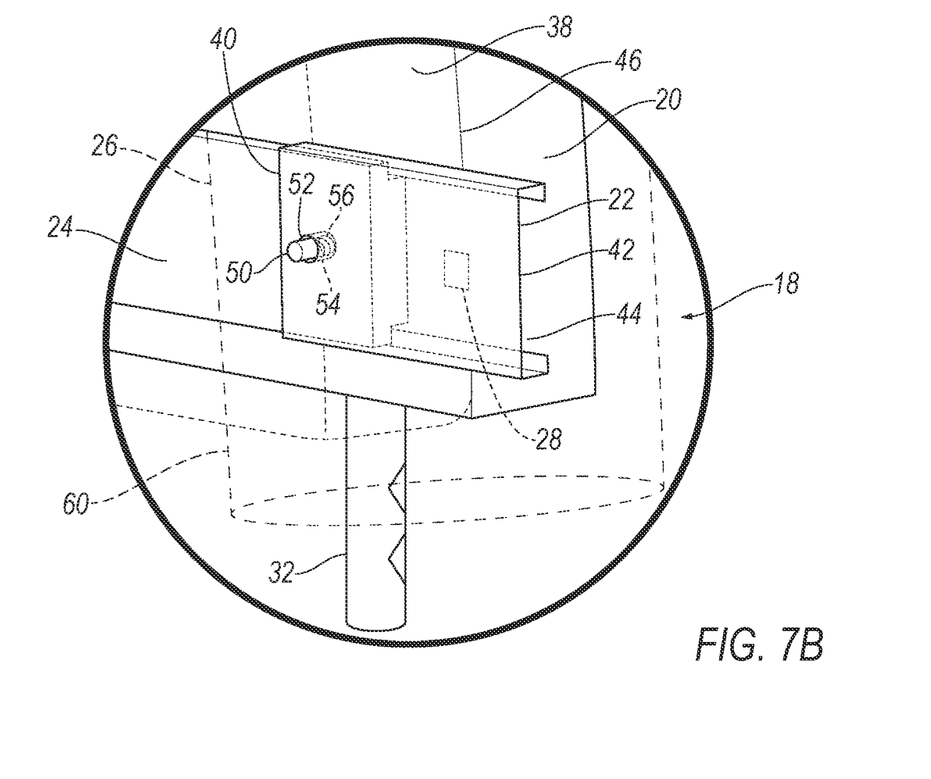
FIG. 7B is a magnified view of a portion of FIG. 6.

With reference to FIG. 7A-B, a lock 48 may lock the sliding member 22 relative to the frame 20 in the deployed position. The lock 48, for example, may be between the sliding member 22 and the track 24. The lock 48 is configured to lock the sliding member 22 relative to the track 24 in the deployed position. The lock 48 may stop movement of the sliding member 22 relative to the track 24 in the deployed position. In some examples, the lock 48 may be mechanically activated under forces associated with the inflation of the airbag 26. For example, the lock 48 may include a spring-loaded pin 50, as described further below. In other examples, the lock 48 may include a ratchet, teeth, wedging components, etc., that lock the sliding member 22 relative to the track 24 in the deployed position. In some examples, the lock 48 may be electrically activated, e.g., locked and unlocked as commanded by a computer of the vehicle 10. In such examples, the lock 48 may include a solenoid or other component that activates the locking of the sliding member 22 relative to the track 24. Specifically, as one example of the lock 48, one of the track 24 or the sliding member 22 may include a spring-loaded pin 50 biased toward the other of the track 24 and sliding member 22, and the other of the track 24 and sliding member 22 may include a hole 52 configured to receive the spring-loaded pin 50 when the sliding member 22 is in the deployed position. In the example shown in the Figures, the track 24 includes the spring-loaded pin 50 and the sliding member 22 includes the hole 52. The spring-loaded pin 50 and the hole 52 are positioned so that the spring-loaded pin 50 and the hole 52 are aligned when the sliding member 22 is in the deployed position. With reference to FIG. 7A, the spring-loaded pin 50 is disengaged with the hole 52 when the sliding member 22 is in the undeployed position. With reference to FIG. 7B, the spring-loaded pin 50 is in the hole 52 when the sliding member 22 is in the deployed position to stop cross-seat movement of the sliding member 22 at the deployed position. As shown in FIGS. 7A-B, the spring-loaded pin 50 is in a cavity 54 and a spring 56 is between the pin 50 and the cavity 54. The spring 56 biases the pin 50 out of the cavity 54. When the sliding member 22 is in the undeployed position, the spring 56 biases the pin 50 against the sliding member 22. As the sliding member 22 slides from the undeployed position toward the deployed position, the sliding member 22 slides along the pin 50. When the hole 52 on the sliding member 22 reaches the pin 50, the spring 56 forces the pin 50 through the hole 52 to engage the sliding member 22.

The airbag 26 is inflatable from the uninflated position to the inflated position in the event of a certain vehicle impacts. In the uninflated position, the airbag 26 may be rolled and/or folded beneath the cover of the head restraint 18. As set forth below, the airbag 26 is inflated by an inflator 58 to inflate from the uninflated position to the inflated position. The airbag 26 includes an inflation chamber that receives inflation medium from the inflator 58 to inflate the airbag 26.

The airbag 26 may be U-shaped in the inflated position. In the example shown in the Figures, the airbag 26 is U-shaped in both the uninflated position and the inflated position. In examples in which the airbag 26 is U-shaped, the airbag 26 in the uninflated position includes two legs 60 each elongated in an upright direction, e.g. along the seat-upright axis A3, and a curved portion 62 extending from one leg 60 to the other leg 60. The curved portion 62 is above the two legs 60 in the example shown in the Figures. The inflation chamber may extend through the two legs 60 and the curved portion 62.

The airbag 26 is supported by the sliding member 22 in the uninflated position and in the inflated position. In other words, the weight of the airbag 26 is borne by the sliding member 22 the uninflated position and in the inflated position.

In examples in which the airbag 26 is U-shaped, both legs 60 of the airbag 26 are anchored to the frame 20 of the head restraint 18. In other words, the legs 60 are supported by the head restraint 18 and remain coupled to the head restraint 18 on both the uninflated position and the inflated position. At least one of the legs 60 is anchored to the frame 20 by being fixed to the sliding member 22 and the other of the legs 60 is anchored to the frame 20 in any suitable fashion (e.g., anchored to the frame 20 by being fixed to one of the sliding members 22, anchored to the frame 20 by being fixed directly to and immoveable relative to the frame 20, etc.). In the example shown in the Figures, one of the legs 60 is fixed to two sliding members 22 and the other of the legs 60 is fixed to two other sliding members 22.

The airbag 26 includes bases 28 anchored to the frame 20. The bases 28 support the rest of the airbag 26 on the frame 20. For example, in the example shown in the Figures, the airbag 26 includes four bases 28 fixed to the four sliding members 22, respectively. In such an example, the four sliding members 22 support the airbag 26 on the frame 20 through the four bases 28 in both the inflated position and the uninflated position. In the example shown in the Figures, the legs 60 include the bases 28. Specifically, two bases 28 are part of one of the legs 60 and two bases 28 are part of the other leg 60. The bases 28 may be, for example, portions of the fabric of the airbag 26. The bases 28 may be fixed to the sliding members 22 in any suitable manner (e.g., by adhesive, fastener, etc.) between the base 28 (e.g., a portion of the fabric of the airbag 26) and the sliding member 22. In any event, in the example in which the base 28 is fixed to the sliding member 22, the base 28 and the sliding member 22 move together as a unit, i.e., are immoveable relative to each other.

As set forth above, the base 28 forces the sliding member 22 from the undeployed position to the deployed position as the airbag 26 moves from the uninflated position to the inflated position. Specifically, since one of the bases 28 on one of the legs 60 is anchored to the frame 20 and another of the bases 28 is fixed to one of the sliders, inflation of the airbag 26 drives the sliding member 22 from the undeployed position to the deployed position. For example, in the example shown in the Figures, the U-shape of the airbag 26 expands from the uninflated position to the inflated position and the legs 60, being fixed to the sliding members 22 at the bases 28, forces the sliding members 22 to the deployed position during expansion of the airbag 26. In the example shown in the Figures, the inflation of the airbag 26 moves two of the sliding members 22 in one direction along the cross-seat axis A2 and moves the other two sliding members 22 in an opposite direction along the cross-seat axis A2. Each of the sliding members 22 may operate as a reaction surface for the airbag 26 in the inflated position.

The airbag 26 may be fabric, e.g., a woven polymer yarn. The woven polymer yarn may be, for example, nylon 66. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 58 is in fluid communication with the airbag 26. The inflator 58 expands the airbag 26 with inflation medium, such as a gas, to move the airbag 26 from the uninflated position to the inflated position. The inflator 58 may be, for example, a pyrotechnic inflator 58 that ignites a chemical reaction to generate the inflation medium, a stored gas inflator 58 that releases (e.g., by a pyrotechnic valve) stored gas as the inflation medium, or a hybrid. The inflator 58 may be in fluid communication with the airbag 26 through a fill tube. The fill tube extends from the inflator 58 to the airbag 26. In such an example, the fill tube and the inflator 58 are connected to the head restraint 18 and assembled to the seatback 16 as a unit.

The inflator 58 may be supported by the seatback 16. i.e., the weight of the inflator 58 may be borne by the seatback 16. In such examples, the inflator 58 may be directly or indirectly mounted to the seatback 16, e.g., the seatback frame, with fasteners such as threaded fasteners, push-pins, Christmas-tree fasteners, etc.

The vehicle 10 includes a computer. The computer includes a processor and a memory. The computer may be a restraints control module. The memory includes one or more forms of computer readable media, and stores instructions executable by the computer for performing various operations, including as disclosed herein and including, for example, a method of deploying the airbag 26 assembly as described herein. The computer stores instructions to control components of the vehicle 10 including the inflator 58. Use of "in response to," "based on," and "upon determining" herein indicates a causal relationship, not merely a temporal relationship.

For example, the computer may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer. The memory may be of any type, e.g., hard disk drives, solid state drives, servers, or any volatile or non-volatile media. The memory may store the collected data sent from the sensors. The memory may be a separate device from the computer, and the computer may retrieve information stored by the memory via a vehicle 10 communication network, e.g., over a CAN bus, a wireless network, etc. Alternatively or additionally, the memory may be part of the computer, e.g., as a memory of the computer.

The computer is generally arranged for communications on the vehicle 10 communication network that may include a bus in the vehicle 10 such as a controller area network CAN or the like, and/or other wired and/or wireless mechanisms. Alternatively or additionally, in cases where the computer includes a plurality of devices, the vehicle 10 communication network may be used for communications between devices represented as the computer in this disclosure. Further, as mentioned below, various controllers and/or sensors may provide data to the computer via the vehicle 10 communication network.

The vehicle 10 may include at least one impact sensor for sensing certain vehicle impacts (e.g., impacts of a certain magnitude, direction, etc.) and the computer is in communication with the inflator 58. In response to detection of certain vehicle impacts, the computer is programmed to activate the inflator 58 to inflate the airbag 26. As set forth above, the inflator 58 may be pyrotechnically activated, in which case, the computer activates the inflator 58 by commanding activation of pyrotechnic charge of the inflator 58, e.g., providing an impulse to a pyrotechnic charge.

The impact sensor may be configured to sense certain vehicle impacts prior to impact, i.e., pre-impact sensing. The impact sensor may be in communication with the computer. The impact sensor is configured to detect certain vehicle impacts. In other words, a "certain vehicle impact" is an impact of the type and/or magnitude for which inflation of the airbag 26 is designed i.e., "certain" indicates the type and/or magnitude of the impact. The type and/or magnitude of such "certain vehicle impacts" may be pre-stored in the computer, e.g., a restraints control module and/or a body control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor may be located at numerous points in or on the vehicle 10.

The disclosure has been described in an illustrative manner, and it is to be understood that the terminology which has been used is intended to be in the nature of words of description rather than of limitation. Numerical adjectives such as "first", "second", "third" and, "fourth" are used herein merely as identifiers do not indicate order or importance. Many modifications and variations of the present disclosure are possible in light of the above teachings, and the disclosure may be practiced otherwise than as specifically described.

What is claimed is:

1. A vehicle-seat assembly comprising:
    a vehicle seat having a seatback;
    a head restraint having a frame supported by the seatback and a sliding member supported by the frame;
    a track between the sliding member and the frame, the sliding member being slidable along the track from an undeployed position to a deployed position; and
    an airbag inflatable from an uninflated position to an inflated position, the airbag having a base fixed to the sliding member in the uninflated position and the inflated position, the base forcing the sliding member from the undeployed position to the deployed position as the airbag moves from the uninflated position to the inflated position.

2. The vehicle-seat assembly of claim 1, wherein the sliding member is rigid relative to the airbag in the deployed position.

3. The vehicle-seat assembly of claim 1, wherein the airbag in the uninflated position includes two legs each elongated in an upright direction and a curved portion extending from one leg to the other leg, one of the legs including the base.

4. The vehicle-seat assembly of claim 3, wherein the other of the legs includes a second base anchored to the frame of the head restraint.

5. The vehicle-seat assembly of claim 1, further comprising an inflator supported by the seatback and a fill tube extending from the inflator to the airbag.

6. The vehicle-seat assembly of claim 1, wherein the sliding member moves translationally along the track from the undeployed position to the deployed position.

7. The vehicle-seat assembly of claim 1, wherein the head restraint is slidably adjustable relative to the seatback.

8. The vehicle-seat assembly of claim 1, further comprising a lock between the track and the sliding member, the lock being configured to lock the sliding member relative to the track in the deployed position.

9. The vehicle-seat assembly of claim 1, wherein the head restraint includes a covering supported by the frame, the sliding member being between the covering and the frame in the undeployed position.

10. The vehicle-seat assembly of claim 1, wherein the airbag is designed to move the slider from the undeployed position to the deployed position as the airbag inflates from the uninflated position to the inflated position.

11. The vehicle-seat assembly of claim 1, further comprising:
a second sliding member supported by the frame; and
a second track between the second sliding member and the frame, the second sliding member being slidable along the second track from an undeployed position to a deployed position;
the airbag having a second base fixed to the second sliding member in the uninflated position and the inflated position, the second base moving with the second sliding member from the undeployed position to the deployed position of the second sliding member.

12. The vehicle-seat assembly of claim 11, wherein the sliding member and second sliding member are elongated coaxially.

13. The vehicle-seat assembly of claim 11, wherein the sliding member and the second sliding member move in opposite directions from the undeployed positions to the deployed positions.

14. The vehicle-seat assembly of claim 11, wherein:
the airbag in the uninflated position includes two legs each elongated in an upright direction and a curved portion extending from one leg to the other leg; and
one of the legs includes the base and the other of the legs includes the second base.

15. A vehicle head restraint comprising:
a frame;
a sliding member supported by the frame;
a track between the sliding member and the frame, the sliding member being slidable along the track from an undeployed position to a deployed position; and
an airbag inflatable from an uninflated position to an inflated position, the airbag having a base fixed to the sliding member in the uninflated position and the inflated position, the base moving with the sliding member from the undeployed position to the deployed position.

16. The head restraint of claim 15, wherein the sliding member is rigid relative to the airbag in the deployed position.

17. The head restraint of claim 16, wherein:
the airbag in the uninflated position includes two legs each elongated in an upright direction and a curved portion extending from one leg to the other leg; and
one of the legs includes the base.

18. The head restraint of claim 15, wherein one of the track and the sliding member includes a spring-loaded pin biased toward the other of the track and sliding member, and the other of the track and sliding member includes a hole configured to receive the spring-loaded pin when the sliding member is in the deployed position.

19. The head restraint of claim 15, wherein the airbag is designed to move the slider from the undeployed position to the deployed position as the airbag inflates from the uninflated position to the inflated position.

20. The head restraint of claim 15, further comprising:
a second sliding member supported by the frame; and
a second track between the second sliding member and the frame, the second sliding member being slidable along the second track from an undeployed position to a deployed position;
the airbag having a second base fixed to the second sliding member in the uninflated position and the inflated position, the second base moving with the second sliding member from the undeployed position to the deployed position of the second sliding member.

* * * * *